United States Patent [19]
Wei

[11] Patent Number: 5,195,107
[45] Date of Patent: Mar. 16, 1993

[54] TECHNIQUE FOR COMPENSATING FOR INTERSYMBOL INTERFERENCE

[75] Inventor: Lee-Fang Wei, Lincroft, N.J.

[73] Assignee: AT&T Bell Laboratories, Murray Hill, N.J.

[21] Appl. No.: 625,406

[22] Filed: Dec. 11, 1990

[51] Int. Cl.[5] .......................................... H04L 25/34
[52] U.S. Cl. ........................................ 375/18; 375/94; 371/43
[58] Field of Search ....................... 375/18, 39, 42, 43, 375/94; 371/43; 332/103; 329/304

[56] References Cited

U.S. PATENT DOCUMENTS

| | | | |
|---|---|---|---|
| 4,538,284 | 8/1985 | Lang et al. | 375/42 |
| 4,562,425 | 12/1985 | Turner et al. | 375/39 |
| 4,720,839 | 1/1988 | Feher et al. | 375/18 |
| 4,894,844 | 1/1990 | Forney, Jr. | 375/39 |
| 4,924,492 | 5/1990 | Gitlin et al. | 371/43 |
| 4,959,842 | 9/1990 | Forney, Jr. | 371/43 |
| 5,022,053 | 6/1991 | Chung et al. | 375/39 |

*Primary Examiner*—Stephen Chin
*Attorney, Agent, or Firm*—R. D. Slusky; G. A. deBlasi

[57] ABSTRACT

In a communications system, a generalized partial response signaling (GPRS) technique is employed to compensate for intersymbol interference. To this end, signal points representative of data to be transmitted are selected from a signal constellation. This signal constellation includes a multiplicity of signal points which are regularly spaced within a polygonal region having more than four sides. The selected signal points are precoded in the transmitter in accordance with the GPRS technique. Because of the particular choice of the signal constellation used, the precoded signal points for transmission occupies a region identical to the polygonal region.

18 Claims, 10 Drawing Sheets

TECHNIQUE FOR COMPENSATING FOR INTERSYMBOL INTERFERENCE

TECHNICAL FIELD

The present invention relates to communications systems and more particularly to a technique for compensating for intersymbol interference incurred in a communications channel.

BACKGROUND OF THE INVENTION

A great deal of research has been performed on a so-called "generalized partial response signaling (GPRS)" technique. This technique is used in a communications system to prevent a transmitted signal from being adversely affected by intersymbol interference incurred in a communications channel. As is well known, the intersymbol interference results from the fact that a typical communications channel inherently has memory such that the signals previously transmitted through the channel interfere with the current, transmitted signal. In accordance with the GPRS technique, a nonlinear filtering device is employed in the transmitter to precode the signal to be transmitted, and this precoding process effects a compensation for the ensuing intersymbol interference affecting such signal. Details on the GPRS technique can be found in: M. Tomlinson, "New Automatic equalizer employing modulo arithmetic," Electron. Lett., Vol. 7, nos. 5/6, March 1971, pages 138–139; H. Harashima and H. Miyakawa, "Matched-transmission technique for channels with intersymbol interference," IEEE Trans. Commun., Vol. COM-20, August 1972, pages 774–780 and J. Mazo and J. Salz, "On the Transmitted Power in Generalized Partial Response," IEEE Trans. Commun., Vol. Com-24, March 1976, pages 348–352, all of which are hereby incorporated by reference.

There are arrangements in the prior art which involve the use of the GPRS technique, coupled with transmission of signal points selected from a multidimensional signal constellation wherein the signal points are regularly spaced. An example of such arrangements is disclosed in a copending U.S. patent application Ser. No. 439,134, entitled "Technique for Achieving the Full Coding Gain of Encoded Digital Signals" and filed on Nov. 20, 1989, which is hereby incorporated by reference. Invariably, after these prior-art arrangements process the selected signal points using the above-mentioned precoding process, the resulting signal points to be transmitted spatially occupy a square region. As a consequence; the average transmission power required to transmit these resulting signal points are oftentimes undesirably higher than the average signal power required by the signal constellation used. Although this increase in the average power can be avoided by using signal constellations having a square shape, the sizes of the square constellations are, however, limited to $N^2$ and $2N^2$ signal points, where N is an even integer. As a result, the square constellations, because of their particular sizes, do not always allow the full utilization of a given channel capacity.

Accordingly, it is desirable to have other signal constellations which, like the square constellations, each call for an average transmission power no more than the average signal power required by the signal constellation when used with the GPRS technique.

SUMMARY OF THE INVENTION

In accordance with the invention, the signal constellations, used in conjunction with the GPRS technique, can assume various shapes, other than a square shape as in the prior art, to realize the desirable saving in the transmission power. These various shapes include polygons each having more than four sides. By virtue of the polygonal constellation shapes, the signal points to be transmitted after the GPRS precoding occupy a region substantially identical to that of the signal constellation having one such shape.

More particularly, the present, polygonal shapes are so designed that a signal constellation in one such shape can be fully interwoven with its translated versions throughout a plane, without leaving any interspace for additional signal points. This being so, the average transmission power needed to transmit those signal points is advantageously no more than the average signal power required by the signal constellation.

DETAILED DESCRIPTION

Figure 1:
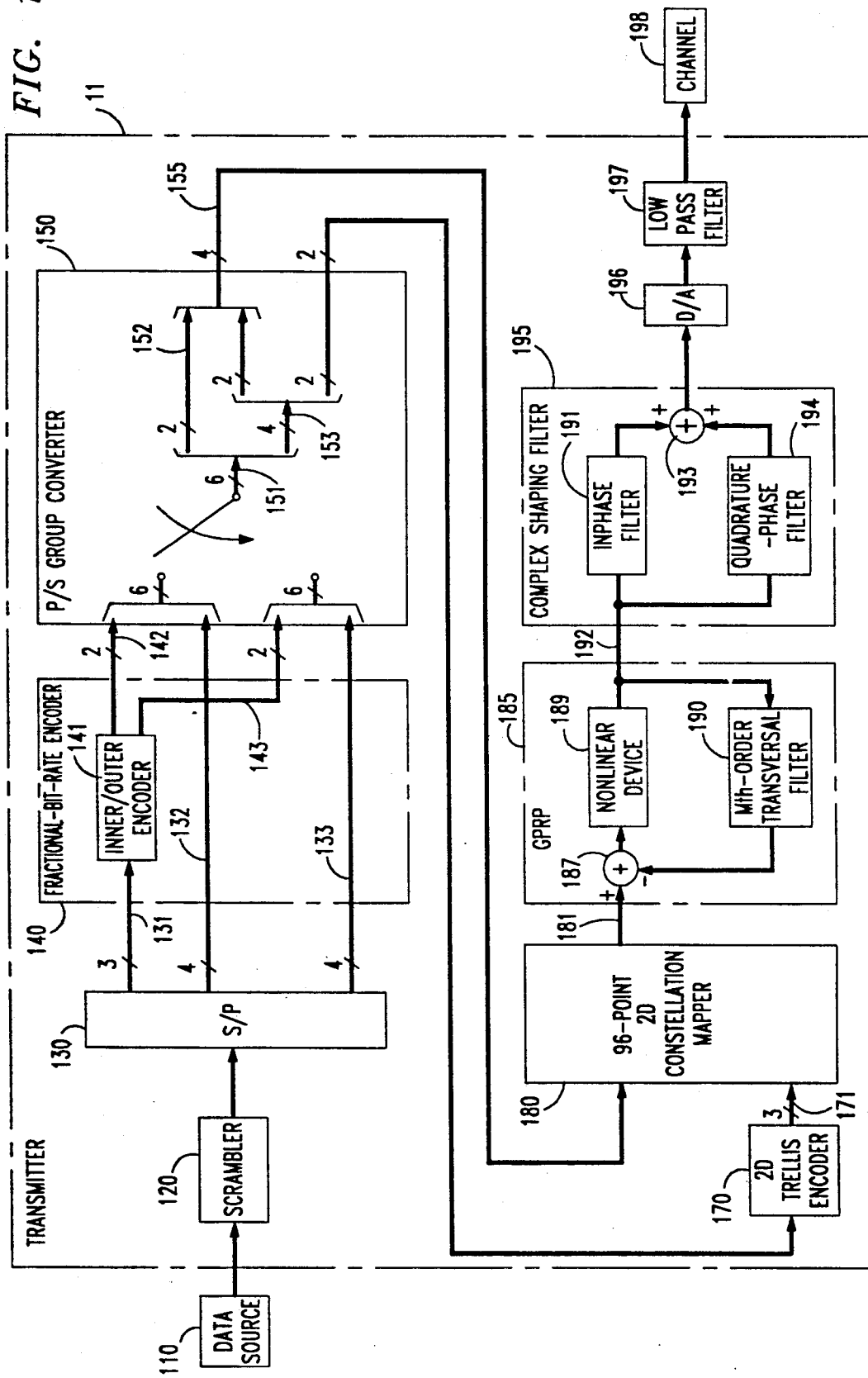
FIG. 1 is a block diagram of a transmitter utilizing a precoding scheme embodying the principles of the invention.

FIG. 1 illustrates transmitter 10 embodying the principles of the present invention. Data source 110, which may be a computer, supplies a data bit stream to transmitter 10 at 484 Kb/s. In this particular illustrative embodiment, each channel symbol to be transmitted represents 5.5 data bits. This being so, the symbol rate is 484/5.5=88 KHz (or a symbol every T=1/88 ms). Since transmitter 10 communicates at a fractional bit rate of 5.5 bits/symbol and encodes, in a manner to be described, the incoming data bit stream with a trellis code, particularly relevant to the design of transmitter 10 is U.S. Pat. No. 4,941,154, issued Jul. 10, 1990 to Wei, which is hereby incorporated by reference.

Specifically, scrambler 120 in transmitter 10 scrambles, in a standard way, the incoming data bit stream. The resulting bit stream is applied to serial-to-parallel converter 130, which aggregates two symbols' worth of bits to provide 11 bits on leads 131, 132 and 133 in the proportions of 3 bits, 4 bits and 4 bits, respectively. These leads extend to circuitry which includes fractional-bit-rate encoder 140 and parallel-to-serial (P/S) group converter 150. The eight bits appearing on leads 132 and 133 are not actually processed by encoder 140 but, rather, pass directly through it. The remaining three bits on lead 131 are processed by inner/outer encoder 141. This encoder is illustratively a simple logic-gate arrangement which respectively provides first and second bit-pairs on leads 142 and 143. The input and output of encoder 141 bear the relationship described in the following TABLE I:

TABLE I

| Input bit pattern of inner/outer encoder 141 | Output of inner/outer encoder 141 | |
|---|---|---|
| | First bit-pair pattern | Second bit-pair pattern |
| 0 0 0 | 0 0 | 0 0 |
| 0 0 1 | 0 0 | 0 1 |
| 0 1 0 | 0 1 | 0 0 |
| 0 1 1 | 0 1 | 0 1 |
| 1 0 0 | 1 0 | 0 0 |
| 1 0 1 | 1 0 | 0 1 |
| 1 1 0 | 0 0 | 1 0 |
| 1 1 1 | 0 1 | 1 0 |

The output of encoder 140 is applied to parallel-to-serial (P/S) group converter 150. The latter operates, in an alternate fashion, in either a first mode or a second mode. In the first mode, coder 140 passes the bit-pair on lead 142 on to lead 152 within P/S group converter 150, and it also passes the four bits on lead 132 on to lead 153 within the same. In the second mode, coder 140 respectively passes, instead, the bit-pair on lead 143 on to lead 152 and the four bits on lead 133 on to lead 153. In either mode, two of the four bits on lead 153 append to the bit-pair on lead 152 to form a 4-bit word on lead 155, which extends to 96-point 2-dimensional (2D) constellation mapper 180. At the same time, the remaining two bits on lead 153 are fed to 2D trellis encoder 170. This encoder implements, in this case, a standard, rate ⅔ trellis code and generates a three-bit word on lead 171, which also extends to constellation mapper 180. The trellis code used here desirably provides coding gain, which, in general, refers to the increased performance of a system resulting from the use of a particular code. Specifically, coding gain is defined as the amount by which the signal-to-noise ratio (SNR) may deteriorate for a system utilizing that particular code before the bit error rate for this system equals that of the the same system without using the code.

Figure 2:
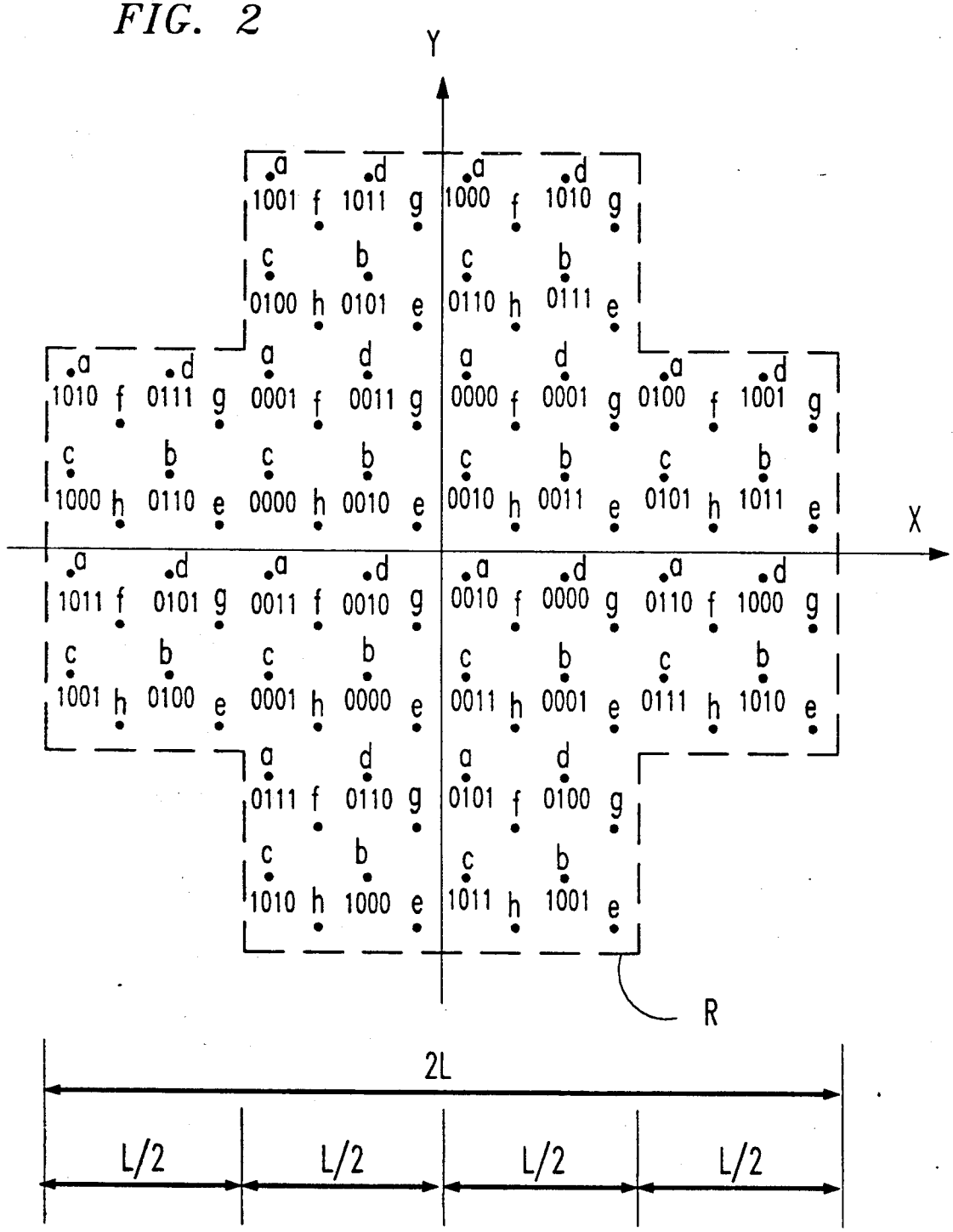
FIG. 2 shows a signal constellation illustratively used in the transmitter of FIG. 1.

The function of constellation mapper 180 is to select, in response to its input, a signal point from a predetermined signal constellation. Refer now to FIG. 2 as well as FIG. 1. The former illustrates a signal constellation used in the present embodiment in accordance with the principles of the invention. This signal constellation includes 96 signal points regularly spaced in a cruciform region R, which defines the domain of the constellation. Each of the signal points belongs to one of eight subsets, as dictated by the trellis code design. These eight subsets are denoted a through h. In fact, the three-bit word on lead 171 identifies to constellation mapper 180 a particular one of the eight subsets from which a signal point is selected. Also shown in FIG. 2 are bit-patterns associated with the signal points, and each of the bit-patterns is made up of four bits. (Although the associated bit-patterns for half the signal points in FIG. 2 are not explicitly shown, the omitted patterns can, however, be easily determined based on the illustrated patterns. In fact, the signal points with the omitted patterns assume the same patterns of their counterparts which can be obtained by 180 degree rotation about the origin.) This being so, constellation mapper 180 selects a particular signal point from the already identified subset by matching the aforementioned 4-bit word on lead 155 with one of these bit-patterns.

Figure 3:
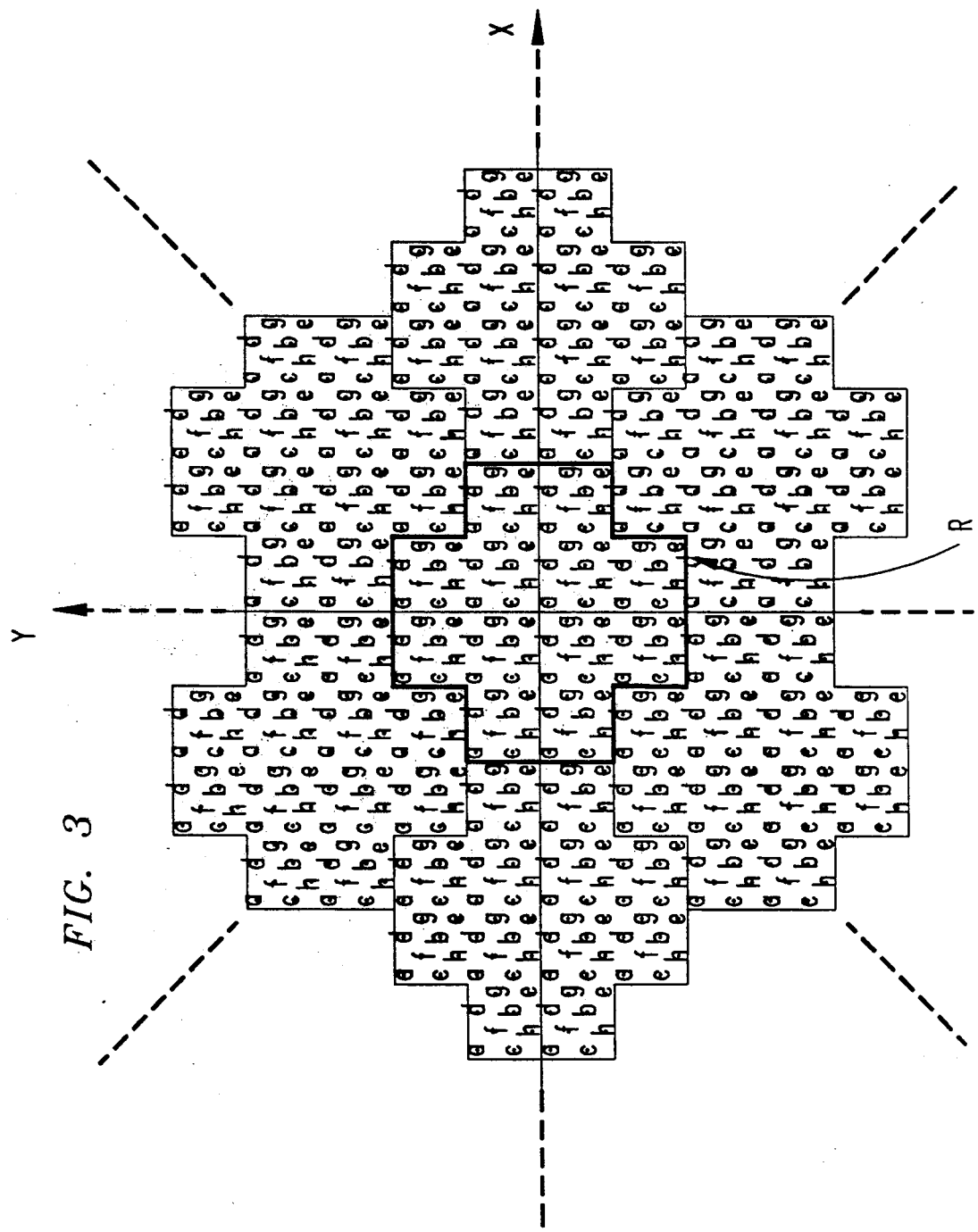
FIG. 3 shows the signal constellation of FIG. 2 which is fully interwoven with its translated versions in a X-Y plane.

It should be pointed out at this juncture a number of important attributes possessed by the constellation of FIG. 2, which attributes are common to the constellations used in GPRS systems in accordance with the invention. These important attributes can be demonstrated by way of FIG. 3. At the center of FIG. 3 is the constellation of FIG. 2 enclosed in the region R. Surrounding the region R and repeated throughout the X-Y plane are a virtually limitless number of constellations, each having the same cruciform shape as R. A closer look reveals that these surrounding constellations are individual translated versions of FIG. 2. As seen in FIG. 3, because of the particular shape of the constellation of FIG. 2, such a constellation can be interwoven with its translated versions having the same shape throughout the X-Y plane, without leaving any interspace for possible additional signal points. Moreover, the signal points in R and the translated versions form a regularly-spaced, rectangular lattice. Similarly, the signal points of individual subsets a through h also form their corresponding rectangular lattices. It can be shown that all of the above-described attributes are important for realizing the coding gain provided by the trellis code when used with the GPRS technique.

Return now to FIG. 1. During the $n^{th}$ signaling interval, constellation mapper 180 provides, on lead 181, a complex signal having a value $I_n + i\, Q_n$ (where $i = \sqrt{-1}$), where $I_n$ and $Q_n$ respectively represent the in-phase and quadrature-phase components of the selected signal point. In terms of the constellation diagram of FIG. 2, these in-phase and quadrature-phase components are equivalent to the "x" and "y" components of the selected signal point. Lead 181 extends to generalized partial response precoder (GPRP) 185 which performs GPRS precoding to its input signal to prevent intersymbol interference from arising in the transmitted signal.

GPRP 185 includes subtracter 187, nonlinear device 189 and Mth-order transversal filter 190. Subtracter 187 receives as an input from Mth-order transversal filter 109 a signal whose value is $s_n^x + i\, s_n^y$, and receives as another input the aforementioned complex signal on lead 181. After performing a subtracting operation, subtracter 187 provides to nonlinear device 189 a complex signal having a value $a_n^x + i\, a_n^y = (I_n - s_n^x) + i(Q_n - s_n^y)$. Nonlinear filter 189 thereupon performs a nonlinear function F on its input signal. The value of the output signal generated by this device is denoted $v_n^x + i\, v_n^y$ and is defined as follows:

$$v_n^x + i v_n^y = F(a_n^x + i a_n^y) = (a_n^x + i a_n^y) + n_1(-L + i3L/2) + n_2(L - i3L/2), \quad (1)$$

where $n_1$ and $n_2$ are integers whose values are chosen in such a way that the point $(v_n^x, v_n^y)$ (i.e., having an x-coordinate $= v_n^x$ and a y-coordinate $= v_n^y$) is within the region R of FIG. 2; and L is defined to be half the maximum width of the region R, as shown in FIG. 2.

The output of nonlinear device 189 appears on lead 192 and is processed by complex shaping filter 195 in a manner to be described. This output signal is also fed back to Mth-order transversal filter 190 which generates the aforementioned signal having the value $s_n^x + i s_n^y$, which is defined in accordance with the following formula:

$$s_n^x + is_n^y = (P_n^t B_n). \quad (2)$$

In this expression, $B_n$ is an (M×1) matrix, or vector, comprised of the M most recent inputs to transversal filter 190. That is, $$B_n = \begin{bmatrix} v_{n-1}^x + iv_{n-1}^y \\ v_{n-2}^x + iv_{n-2}^y \\ \cdot \\ \cdot \\ \cdot \\ v_{n-M}^x + iv_{n-M}^y \end{bmatrix},$$

where M is a finite integer. The value of M is determined based on the characteristics of the channel used. (In the present embodiment, the channel is, illustratively, a "local loop" of the type used in a standard telephone cable network to connect customer premises to a central office, and it is conventionally a 24 gauge two-wire cable having no bridge tap and a maximum length of 18 Kft. The value of M associated with such a local loop has been experimentally determined to be 7.)

$P_n$ is an (M×1) vector or matrix comprised of an ensemble of M tap coefficients associated with transversal filter 190. That is, $$P_n = \begin{bmatrix} p_{n-1}^x + ip_{n-1}^y \\ p_{n-2}^x + ip_{n-2}^y \\ \cdot \\ \cdot \\ \cdot \\ p_{n-M}^x + ip_{n-M}^y \end{bmatrix},$$

where $p_{n-1}^x + i p_{n-1}^y$, $p_{n-2}^x + i p_{n-2}^y \ldots p_{n-M}^x + i p_{n-M}^y$ are complex numbers used as the respective M tap coefficients. (The superscript "t" used in formula (2) indicates the matrix transpose operation wherein (M×1) vector $P_n$ is transposed into (1×M) vector for the purpose of matrix multiplication.)

In the course of the precoding process, GPRP 185 renders, in a conventional manner, more different values assumable by each of $v_n^x$ and $v_n^y$ than each of the respective in-phase and quadrature-phase component inputs. This being so, $v_n^x$ and $v_n^y$ respectively represent more "x" and "y" components of signal points than do those component inputs. That is, after the precoding process, $v_n^x$ and $v_n^y$ combinedly represent more signal points to be transmitted than the signal points defined in the constellation of FIG. 2. It should be noted at this point that in the prior art, these signal points for transmission, which hereinafter are referred to as "GPRS processed signal points", normally occupy a square region of dimensions 2L by 2L. It can be shown that these GPRS processed signal points would undesirably require an average transmission power higher than the average signal power required by a prior art signal constellation having a shape other than square. By contrast, in accordance with the present invention, because of the use of the signal constellation in the shape of the region R, which is a polygon having more than four sides, the GPRS processed signal points occupy a region identical to R, rather than a 2L by 2L square as in the prior art. Advantageously, the average transmission power here is no more than the average signal power required by the constellation of FIG. 2.

The signal on lead 192 is applied to complex shaping filter 195, which generates a passband signal which is illustratively a so-called "carrierless AM/PM" signal. Implementationally, complex shaping filter 116 includes two finite-impulse-response digital filters—in phase filter 191 and quadrature-phase filter 194—which respectively process the real and imaginary components of the complex signal on lead 192. Each of these filters is illustratively realized as a transversal filter. Filters 191 and 194 differ from each other only in that their phase characteristics are offset from one another by $\pi/2$. This phase difference enables the receiver to separately reconstruct the real and imaginary components of the signal on lead 192. The outputs of filters 191 and 194 are combined in adder 193 to provide a digital version of the signal to be transmitted.

It is important to note that the approach taken within complex shaping filter 195 for generating a passband signal in response to the signal point represented by the signal on lead 192 is different from the modulation typically used in, for example, voiceband modems, such as quadrature amplitude modulation (QAM). In the latter, specifically, an explicit or implicit (depending on the implementation) rotation of the symbols by a carrier-frequency-dependent angle occurs. However no such explicit or implicit rotation is performed with carrierless AM/PM. This is significant because unless there happens to be an integral relationship between the carrier frequency and the symbol interval T (which is not likely to be the case if the carrier frequency and symbol interval values are chosen to optimize the performance of the transmission scheme as a whole), the aforementioned rotation operation will involve a non-trivial multiplication, thereby adding a significant cost to the transmitter. A further advantage is that carrierless AM/PM is more simply processed at the receiver than, for example, QAM. Additionally, carrierless AM/PM is potentially more robust in the presence of non-linearities, such as those introduced in the analog-to-digital conversion performed in the receiver.

The output of complex shaping filter 195 is converted to analog form by D/A converter 196 whose output is then passed through low-pass filter 197 to remove the higher-frequency images of the desired signal. The resulting analog signal is applied to channel 198 which, as noted earlier, is illustratively a telephone local loop.

Figure 4:
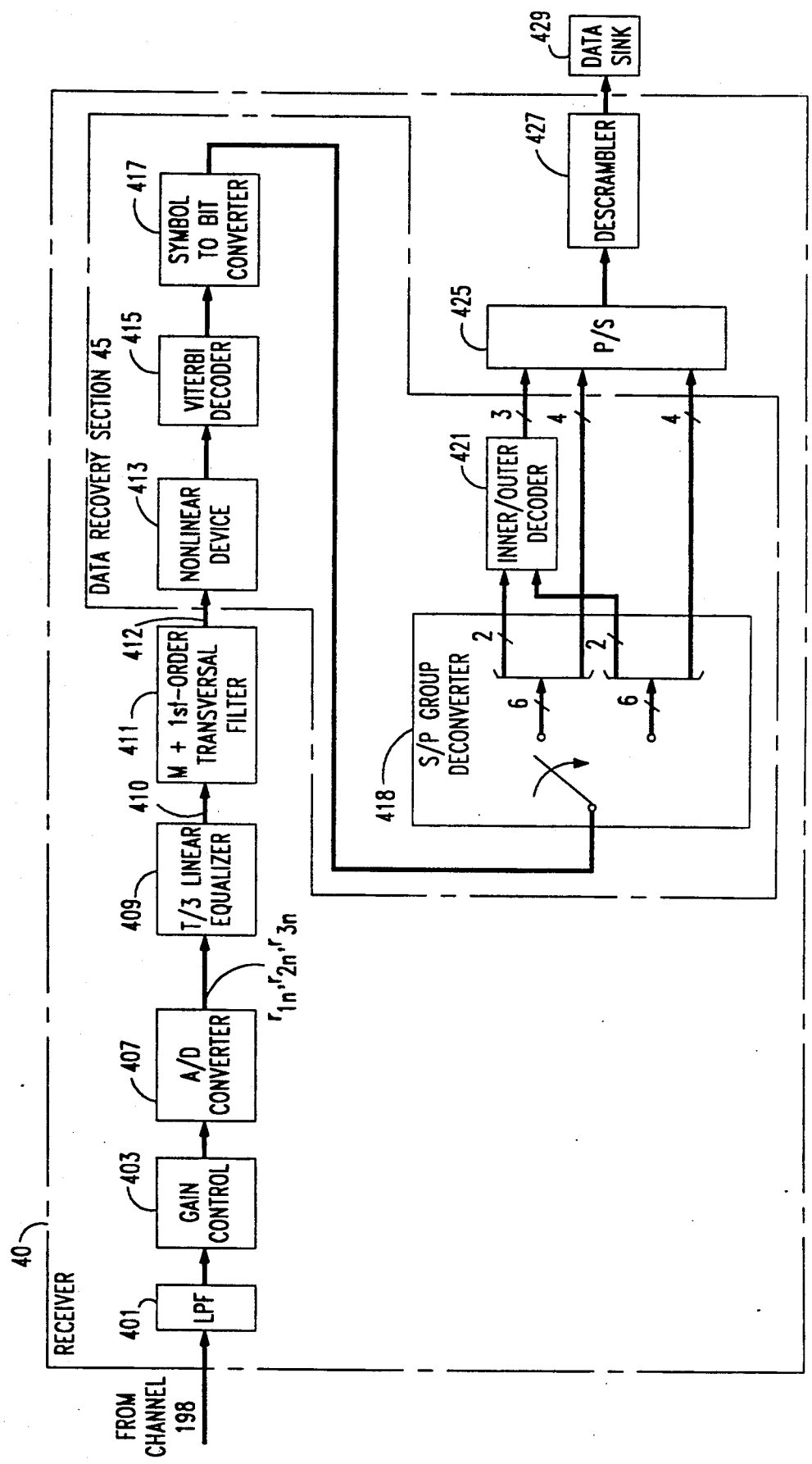
FIG. 4 is a block diagram of a receiver communicating with the transmitter of FIG. 1.

Turning now to FIG. 4, the analog signal on channel 198 is received by receiver 40 wherein low-pass filter 401 filters out energy in the received signal at frequencies nominally above the spectrum of the transmitted signal. The resulting signal passes to gain control circuit 403 which is programmable to adjust the gain imparted to its input so as to make maximum use of the precision of A/D converter 148 which follows. This A/D converter generates samples of the received signal at 3/T samples per second. T/3 linear equalizer 409 eliminates from these samples so-called "precursors", the intersymbol interference incurred in channel 198. To this end, samples $r_{1n}$, $r_{2n}$ and $r_{3n}$ are applied to linear equalizer 409 which is of conventional design and which may be, for example, of the type disclosed in U.S. Pat. No. 3,868,603 issued Feb. 25, 1975, to Guidoux, hereby incorporated by reference. Since linear equalizer 409 receives and processes more than one input for each symbol interval T, it is referred to as a "fractionally spaced" equalizer. It is, more specifically, referred to as a T/3 type of fractionally spaced equalizer since it receives and processes inputs at a rate of three per symbol interval, and thus has a so-called "tap" spacing of T/3. The output of T/3 linear equalizer 409 is generated on to lead 410 once per symbol interval and has a complex value $EQ_n$ whose real and imaginary components are, respectively, $eq_n^x$ and $eq_n^y$.

Channel 198, being a local loop, like many other channels, contributes to the transmitted signal points mostly "colored", rather than "white", noise arising from cross-talk within the transmission cable. However, the trellis codes that have been developed to date, including, for example, the code used in the present embodiment, are known to provide coding gain in the presence of "white" noise. This being so, in order to substantially realize the full coding gain of the trellis code used, the noise that appears in trellis-coded signals to be processed by decoder 415 needs to be whitened before the signals are decoded.

To this end, the complex signal on lead 410 is input to conventional M+1st-order transversal filter 411 which whitens the noise in that signal. Thus, transversal filter 411 provides, on lead 412, an output signal having the noise component ensured to be white. This output signal has a complex value $Z_n$ which is defined in accordance with the following formula:

$$Z_n = z_n^x + iz_n^y = (eq_n^x + ieq_n^y) + P_n^t U_n. \quad (3)$$

In this formula, $z_n^x$ and $z_n^y$ are, respectively, real and imaginary components of $Z_n$; $eq_n^x$, $eq_n^y$ and $P_n$ have been defined hereinbefore; and $U_n$ is an (M×1) matrix, or vector, comprised of the M most recent complex output samples of linear equalizer 409. That is, $$U_n = \begin{bmatrix} eq_{n-1}^x + ieq_{n-1}^y \\ eq_{n-2}^x + ieq_{n-2}^y \\ \cdot \\ \cdot \\ eq_{n-M}^x + ieq_{n-M}^y \end{bmatrix},$$

It should be noted at this juncture that the above-described whitening process performed by transversal filter 411 would normally have introduced, as a concomitant, intersymbol interference or specifically so-called "post-cursors" into its output signal. The generation of these "post-cursors" is, however, prevented by using the aforementioned GPRS precoding in the transmitter.

Figure 5:
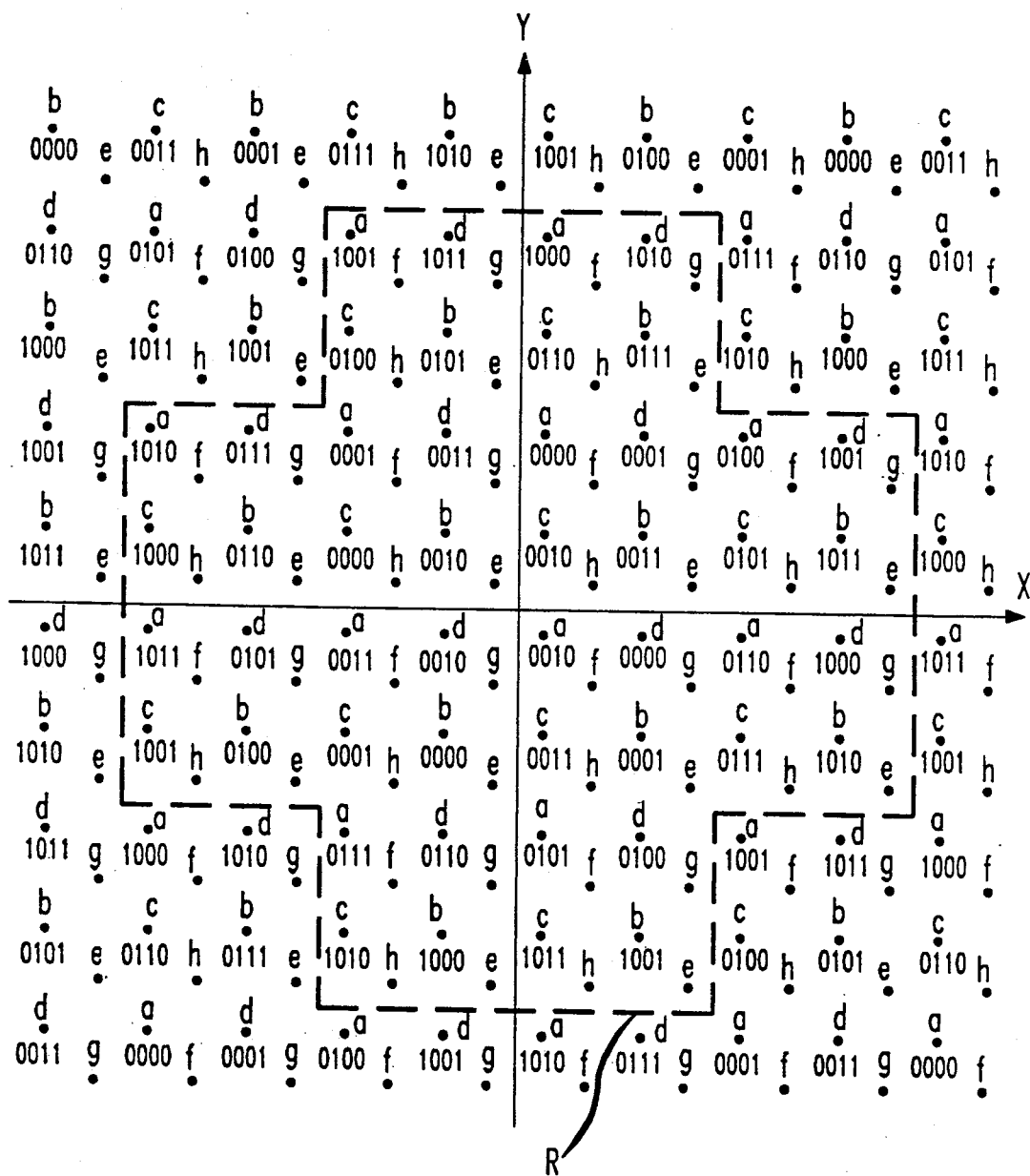
FIG. 5 shows a configuration of allowed signal points used for decoding in the receiver of FIG. 4.

The complex signal on lead 412 is applied to data recovery section 45 wherein nonlinear device 413 processes this complex signal in accordance with the GPRS technique. Nonlinear device 413 is identical to nonlinear device 189 of FIG. 1. The resulting signal from nonlinear device 413 is fed to Viterbi decoder 415 which performs a trellis decoding on the incoming signal using the Viterbi algorithm. This algorithm generates the "maximum likelihood" decisions as to what the transmitted signal points were. In particular, among other things, the Viterbi algorithm, in a standard way, identifies a signal point from each of the subsets of a reference constellation comprising so-called "allowed" signal points. Such a signal point is identified to be the closest (in Euclidean distance) of all other signal points within its subset to the point represented by the respective real and imaginary components of the aforementioned incoming signal. Because of the fact that the present arrangement involves nonlinear device 413, the reference constellation used by the Viterbi algorithm to identify the closest signal points in this instance is different from FIG. 2, which the Viterbi algorithm normally references. It can be shown that the reference constellation, here, should be an enlarged version of FIG. 2, as illustrated in FIG. 5. (Details on the Viterbi Algorithm can be found in G. D. Forney, "The Viterbi Algorithm", *Proceedings of the IEEE*, Vol. 761, pp. 268–278, March, 1973, which is hereby incorporated by reference.) FIG. 5 has in the center the constellation of FIG. 2 occupying the region R and additional 104 signal points surrounding the region R. A closer look at FIG. 5 reveals that the enlarged constellation is a section carved out of the center of FIG. 3. Moreover, each allowed signal point in FIG. 5 is identified by a subset affiliation and a 4-bit pattern. Although the bit patterns of half the signal points in FIG. 5 are not explicity shown, those signal points assume the same, illustrated patterns of their counterparts which can be obtained by a 180 degree rotation.

Returning now to FIG. 4, Viterbi decoder 415 provides a signal representative of the maximum likeihood decisions to symbol-to-bit converter 417. This converter performs the inverse function to constellation mapper 180 of transmitter 10, thereby recovering the digital bits represented by the transmitted signal points. Specifically, during each signaling interval, converter 417 provides S/P group deconverter 418 with a six-parallel-bit word corresponding to the six bits on leads 152 and 153 of transmitter 10. S/P group deconverter 418 receives such six-parallel-bit words and processes them in pairs. The first two bits in each of a pair of the words are provided to inner/outer decoder 421. The remaining four bits of each of the pair are provided to P/S converter 425. In response to its input, inner/outer decoder 421 performs the inverse function to inner/outer coder 141 of FIG. 1, thereby providing three parallel bits also to P/S converter 425. This converter supplies a serial bit stream for descrambler 427 to descramble. The descrambled bit stream is thereupon applied to data sink 429 which may be, for example, a computer terminal.

Figure 6:
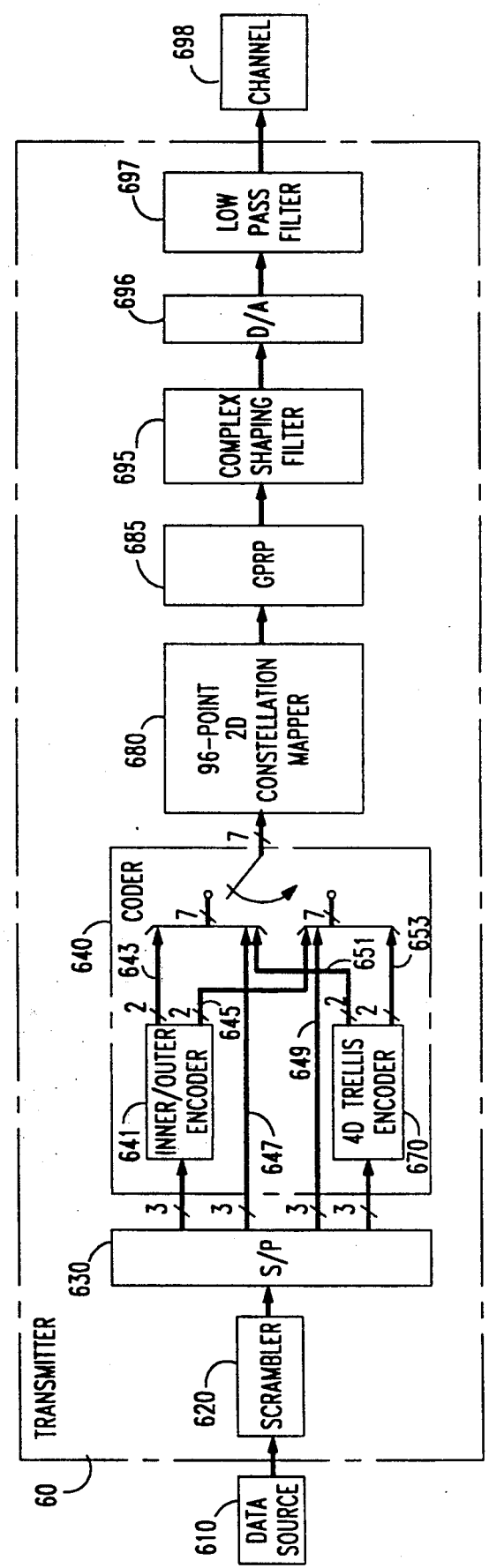
FIG. 6 is a second embodiment of a transmitter utilizing the precoding scheme embodying the principles of the invention.

A second embodiment according to the invention includes transmitter 60, which is shown in FIG. 6. Here, data is transmitted at 480 Kb/s at a symbol rate of 40 KHz (or at a symbol interval=1/40 ms). Thus, each symbol in this illustrative embodiment is representative of 12 data bits. Moreover, each symbol is 4-dimensional (4D) and can be represented as a pair of signal points. This pair of signal points are transmitted over two individual signaling intervals each of 1/80 ms duration.

Many of the circuit elements of transmitter 60 are the same as or similar to those of transmitter 10 in FIG. 1. Thus, for example, data source 610 supplies a data bit stream at 480 Kb/s to transmitter 60 wherein scrambler 620 scrambles the incoming bit stream. S/P converter 630 collects a group of 12 bits from the scrambled bit stream once every symbol interval. It then provides a 12-parallel-bit word to coder 640. Six bits of this word appear on leads 647 and 649 each having an equal share of three bits. The remaining six bits form two 3-bit subwords which are respectively processed by inner-/outer encoder 641 and 4D trellis encoder 670. Encoder 641, which is structurally identical to inner/outer encoder 141 of FIG. 1, generates two bit-pairs on respective leads 643 and 645. 4D trellis encoder 670 implements a standard, rate $\frac{2}{3}$ trellis code and generates two bit-pairs on respective leads 651 and 653.

Figure 7:
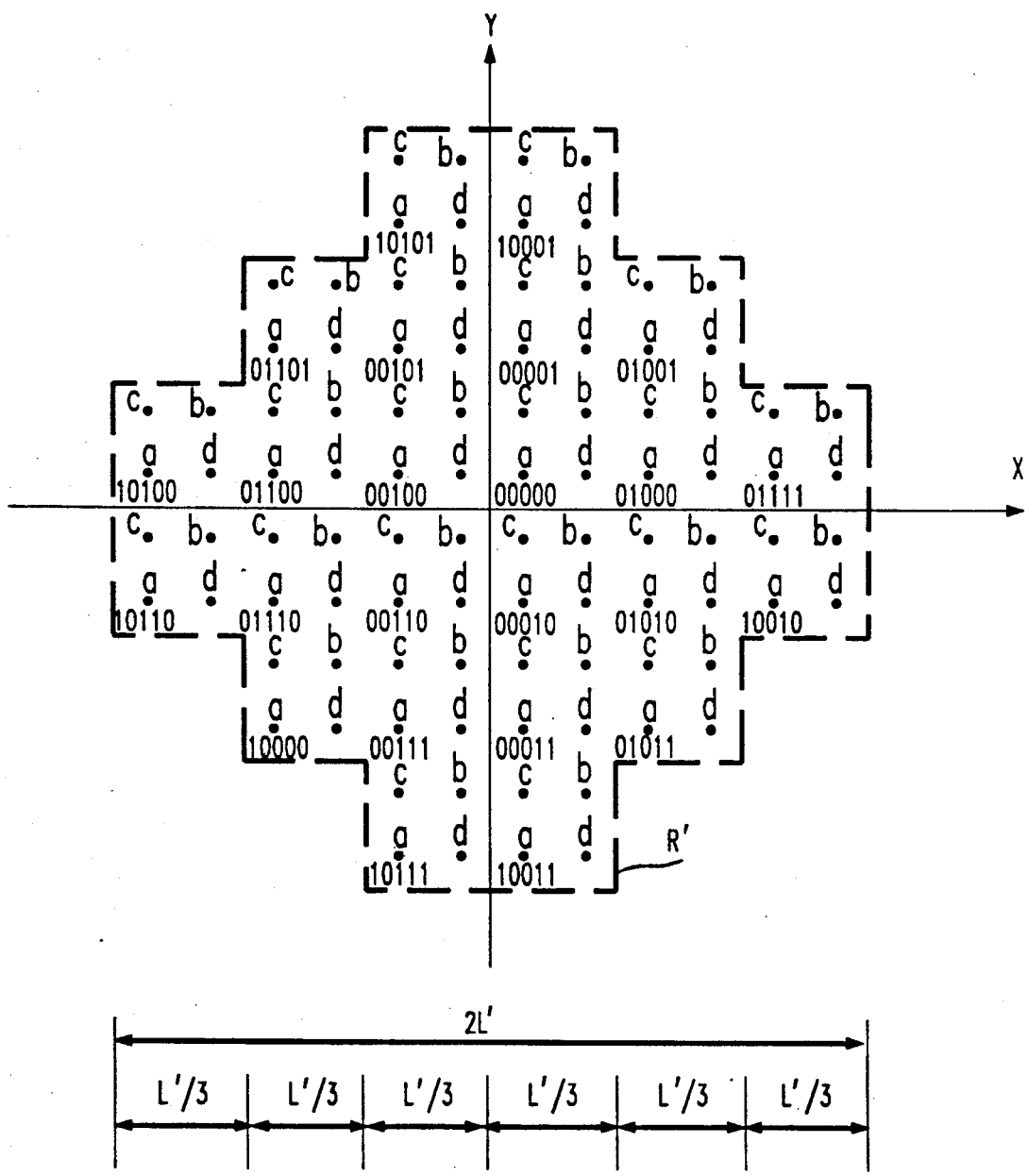
FIG. 7 shows a signal constellation illustratively used in the transmitter of FIG. 6.

During each signaling interval, coder 640 feeds 96-point 2D constellation mapper 680 alternately with either the seven bits on leads 643, 647 and 651 combined or the seven bits on leads 645, 649 and 653 combined. Referring now to FIG. 7 as well as FIG. 6, the former shows a 2D constellation illustratively used here. As shown in FIG. 7, the 2D constellation includes 96 signal points regularly spaced in a region R', which defines the domain of the constellation. It is noteworthy that the shape of this 2D constellation is, again, a polygon having more than four sides; and this shape, again, enables the constellation and its translated versions to be fully interwoven througout the X-Y plane, without leaving any interspace for possible, additional signal points.

Each of the signal points in the 2D constellation belongs to one of four subsets, as dictated by the design of the trellis code used. These four subsets are denoted a, b, c and d. Also shown in FIG. 7 are bit-patterns associated with the signal points, and each of these bit-patterns is made up of five bits. (Although the associated bit-patterns for three-quarters of the signal points in FIG. 7 are not explicitly shown, the omitted patterns can be easily determined based on the illustrated patterns. In fact, the signal points with the omitted patterns assume the same patterns of their counterparts which can be obtained by 90 degree rotations.) During each signaling interval, constellation mapper 680 selects a particular signal point of the constellation using the received seven-bit word. To this end, the bit-pair within the seven-bit word from either lead 651 or lead 653 is used to identify one of the four subsets from which the signal point is selected. Furthermore, the remaining five bits of the seven-bit word are used to identify the particular signal point from the already identified subset by matching those bits with the bit-pattern associated with that particular signal point.

The selected signal point is represented by a complex signal and is processed by GPRP 685 which is structurally identical to GPRP 185 of FIG. 1. The nonlinear device (not shown) of GPRP 685, however, implements a nonlinear function F', in contrast to the nonlinear function F in the first embodiment. Specifically, the nonlinear device output having a complex value, $w_n^x + i w_n^y$, is defined in accordance with the following formula:

$$w_n^x + i w_n^y = F'(\beta_n^x + i\beta_n^y) = \beta_n^x + i\beta_n^y + n'_1(L' + i4L'/3) + n'_2(L' - i4L'/3), \quad (4)$$

where $\beta_n^x + i\beta_n^y$ denotes the value of the complex input signal to the nonlinear device of GPRP 685; $n'_1$ and $n'_2$ are integers whose values are chosen in such a way that the point $(w_n^x, w_n^y)$ is within the region R' of FIG. 7; and L' is defined to be half the maximum width of the region R', as indicated in FIG. 7.

Because of the particular choice of the 2D constellation of FIG. 7 used in the present embodiment, the GPRP processed signal points occupy a region identical to R', rather than a square region as in the prior art. Advantageously, the average transmission power required here is, again, no more than the average signal power required by the constellation of FIG. 7.

The output of GPRP 685 which represents the GPRP processed signal points is fed to complex shaping filter 695 (identical to complex shaping filter 195), followed by D/A converter 696 and low pass filter 697. The resulting signal representing a GPRS processed signal point is applied once every signaling interval to channel 698, which is identical to channel 198 as described hereinbefore.

Figure 8:
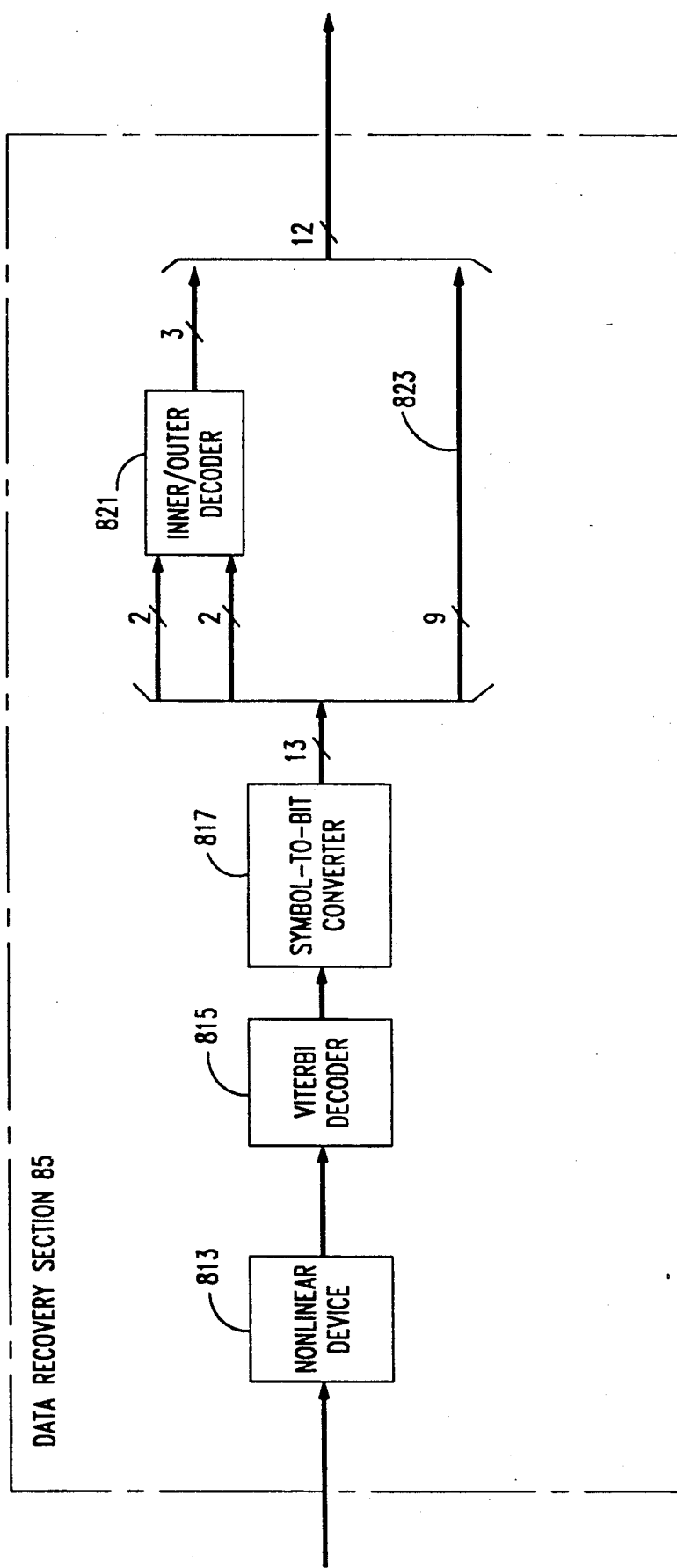
FIG. 8 is a block diagram of a data recovery section in a receiver communicating with the transmitter of FIG. 6.

The receiver in this second embodiment is substantially similar to receiver 40 of FIG. 4. The principal difference lies in the design of the data recovery section of the new receiver. As shown in FIG. 8, data recovery section 80 of the new receiver, includes, inter alia, nonlinear device 813, decoder 815, symbol-to-bit converter 817 and inner/outer decoder 821. Once every signaling interval, nonlinear device 813 receives a signal which has been processed by processors structurally identical to those preceding nonlinear device 413 of receiver 40. Nonlinear device 813 performs the aforementioned function F' to this signal. The resulting signal is fed to decoder 815 for it to make the maximum likelihood decisions as to what the transmitted signal points were in accordance with the Viterbi algorithm.

Figure 9:
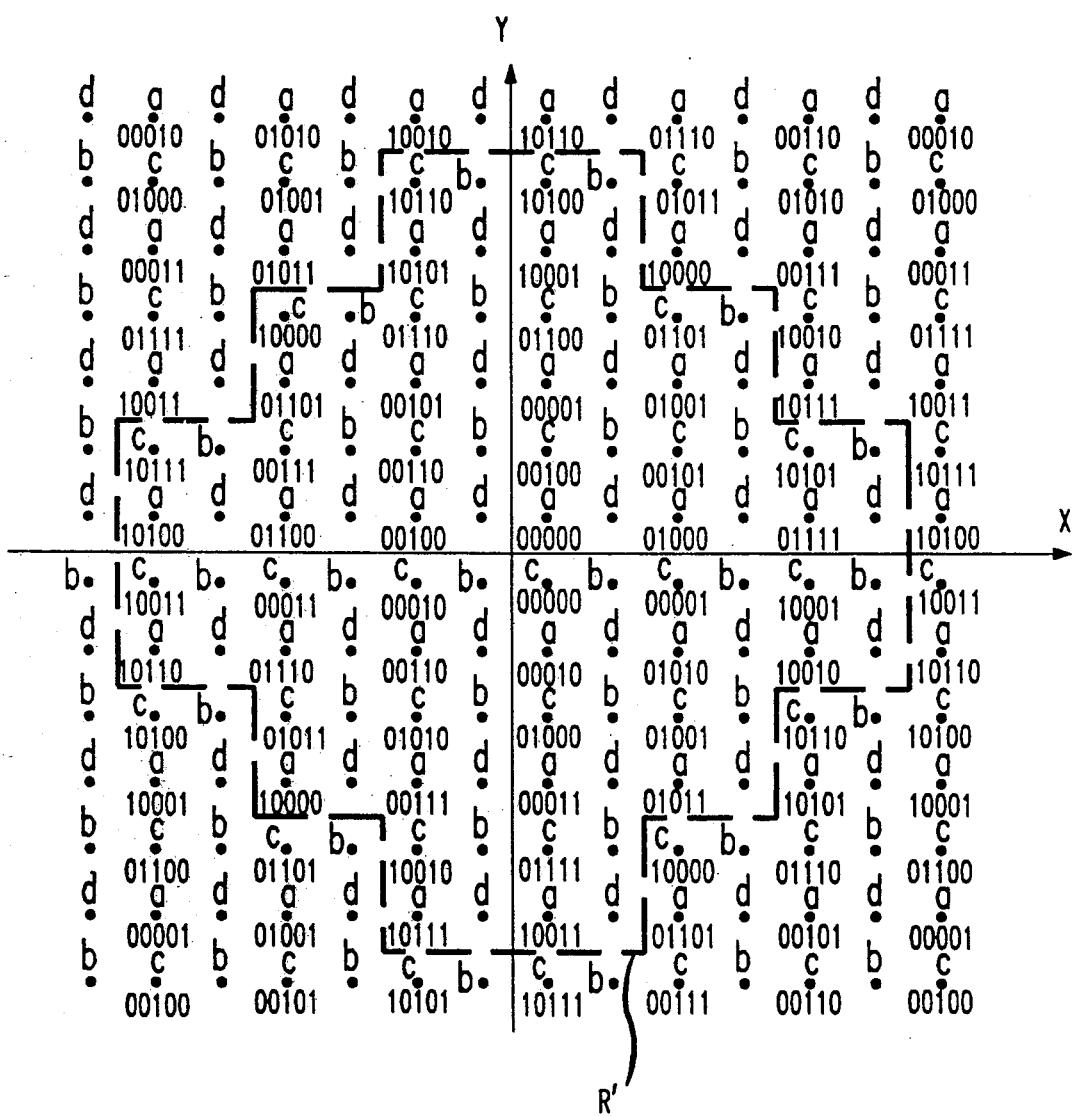
FIG. 9 shows a configuration of allowed signal points used for decoding in the data recovery section of FIG. 8.

The constellation comprising the allowed signal points referenced by the Viterbi algorithm in the present embodiment, like the first embodiment, is an enlarged version of that shown in FIG. 7. FIG. 9 illustrates this reference constellation. A closer look at FIG. 9 reveals that it has, in the center, the constellation of FIG. 7 defined by the region R' and 100 additional signal points surrounding R'. Each allowed signal point in FIG. 9 is identified by a subset affiliation and a 5-bit pattern. Although the bit patterns of half the signal points in FIG. 9 are not explicitly shown, those signal points assume the same, illustrated patterns of their counterparts which can be obtained by a 180 degree rotation.

Return now to FIG. 8. A signal representative of the maximum likelihood decisions is provided by decoder 815 to symbol-to-bit converter 817. Accordingly, converter 817, which performs the inverse function to constellation mapper 680, recovers seven bits during each signaling interval. Furthermore, converter 817 accumulates 14 bits over a pair of signal intervals constituting a symbol interval. One of the 14 accumulated bits is discarded as it represents redundancy imposed by the particular trellis code used in this embodiment. Thus, during each symbol interval, converter 817 provides 13 bits at its output. Nine of these 13 bits are passed out of data recovery section 85 via lead 823. The remaining four bits form first and second bit-pairs corresponding to the two respective bit-pairs at the output of inner/outer encoder 641 of FIG. 6. In response to these first and second bit-pairs, inner/outer decoder 821 performs the inverse function to encoder 641, thereby generating three parallel bits as an output. These three bits are passed out of data recovery section 85 along with the aforementioned nine bits on lead 823. The resulting twelve bits outputted by data recovery section 85 is further processed by the processors similar to those succeeding data recovery section 35 in receiver 30 of FIG. 3. The individual functions of these processors are apparent based on the disclosure heretofore and thus need not be dwelled upon here.

Figure 10:
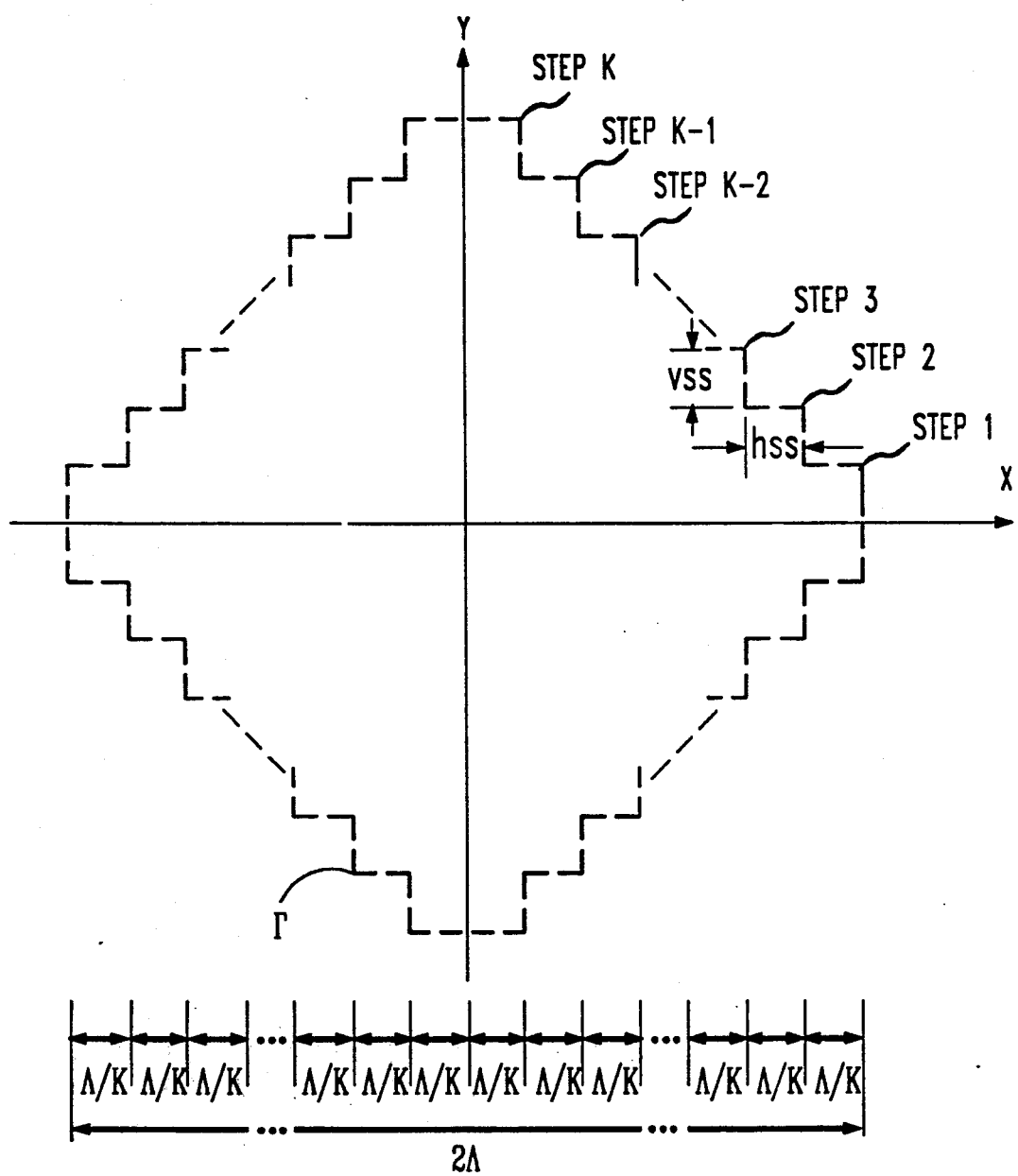
FIG. 10 is a generic signal constellation for use with the precoding scheme in accordance with the invention.

It can be shown that the above-noted advantage—a saving in transmission power—realized in the first and second embodiments by virtue of the use of the signal constellations of FIGS. 2 and 5, respectively, can also be realized using other signal constellations, which are generically represented in FIG. 10. In this figure, the signal points (not shown) are regularly spaced within a region Γ which is a polygon in the center of an X-Y plane. This region Γ defines the domain of a generic constellation in accordance with the present invention. As seen in FIG. 10, the top half of this generic constellation is defined by steps 1 through K in the first quadrant of the X-Y plane, and another K steps in the second quadrant which are the mirror images of those steps 1 through K reflecting along the Y-axis, where $K>1$. Furthermore, the bottom half of the generic constellation is defined by the mirror image of the top half reflecting along the X-axis. The vertical and horizontal step sizes, respectively denoted vss and hss, are each $\Lambda/K$ in length, where $\Lambda$ is half the maximum width of region Γ.

It can also be shown that the generic constellation can have either a first size or a second size, determined by the number of signal points which are regularly spaced therein. Specifically, the first size refers to a number of $K(K+1)N_1^2$ signal points for any positive even integer $N_1$. The second size refers to a number of $2K(K+1)N_2^2$ signal points for any positive integer $N_2$. In fact, the signal constellation of FIG. 2 is an exemplary constellation of FIG. 10 having a first size, with $K=2$, $N_1=4$ and $\Lambda=L$. Moreover, the signal constellation of FIG. 7 is an exemplary constellation of FIG. 10 having a second size, with $K=3$, $N_2=2$ and $\Lambda=L'$.

It is important to note that any constellation derived from FIG. 10 can be fully interwoven with its translated versions throughout the X-Y plane. It is this last property of the constellation enables one to realize the above-noted advantage. This being so, it is anticipated that a hexagonal constellation which, although not included in FIG. 10, satisfies this last property and, in fact, can be advantageously utilized in accordance with the invention.

The foregoing merely illustrates the principles of the invention and those skilled in the art will be able to devise numerous arrangements which, although not explicitly shown or described herein, embody the principles of the invention. By way of example, but not limitation, some possible variations and alternatives will now be described.

For example, although the generic constellation disclosed herein has the vertical step size—vss—identical to the horizontal step size—hss, they can, however, be different if so desired.

The illustrative embodiments have disclosed the invention in the context of transmission on a local-loop which is a two-wire cable. An alternative, however, is to use a four-wire loop, i.e., a separate two-wire loop for each direction of transmission. Moreover, this invention is equally usable with other channels such as a voiceband telephone channel.

The invention has been disclosed using carrierless AM/PM. However, other passband transmission schemes, including non-carrierless schemes such as quadrature-amplitude modulation, can be used to implement the invention. Similarly, although the illustrative embodiments utilize a two-dimensional modulation scheme, the invention can be implemented using modulation schemes of any other desired dimensionality, including, for example, one, four or eight dimensions. Advantageously, a multi-dimensional modulated signal may be more robust in the presence of particular channel impairments than, say, a one-dimensional, e.g., single sideband, modulated signal. In addition, as long as the coordinates of the symbol in each dimension are dependent—that is, each coordinate is a function of all of the data bits that the symbol represents, rather than being an independent function of some subset of those bits—increasing the dimensionality of the symbols increases the margin against noise and various channel impairments. Indeed, the improved receiver error performance may be sufficiently significant to make worthwhile the added implementational complexity of using, say, eight dimensions.

Finally, the invention is disclosed herein in a form in which the various signal processing functions are performed by discrete functional blocks. However, any one or more of these functions could equally well be performed by one or more appropriately programmed microprocessors, microcoded digital signal processing chips, etc.

I claim:

1. Data transmission apparatus comprising
   means for selecting signal points from a signal constellation derived from a rectangular lattice which includes a plurality of signal points within a polygonal region having more than four sides, each of said plurality of signal points being representative of data;
   means for processing the selected signal points using a generalized partial response signaling (GPRS) technique such that subsequent distortion affecting accurate recovery of said selected signal points is reduced, the processed signal points occupying a region substantially identical to said polygonal region; and
   means for transmitting a signal representing said processed signal points.

2. The apparatus of claim 1 wherein said signal constellation has such a shape that said signal constellation and translated versions thereof can be interwoven throughout a plane without leaving any interspace for additional signal points.

3. The apparatus of claim 1 wherein said data is encoded with a trellis code.

4. Receiver apparatus for recovering data represented by transmitted signal points, said transmitted signal points having been encoded by precoding means to reduce subsequent distortion affecting accurate recovery of said data in accordance with a GPRS technique, said apparatus comprising
   means for receiving said transmitted signal points, which occupy a region whose shape is substantially identical to that of a signal constellation, said signal constellation being derived from a rectangular lattice and including a plurality of signal points, said transmitted signal points being derived from selected ones of said plurality of signal points, said region being polygonal and having more than four sides; and
   means for recovering said data, said recovering means including means for compensating for effects of said precoding means.

5. The apparatus of claim 4 wherein said signal constellation has such a shape that said signal constellation and translated versions thereof can be interwoven throughout a plane without leaving any interspace for additional signal points.

6. The apparatus of claim 4 wherein said data is encoded with a trellis code.

7. A data communications system comprising means for selecting signal points from a signal constellation derived from a rectangular lattice which includes a plurality of signal points within a polygonal region having more than four sides, each of said plurality of signal points representing data;

means for precoding the selected signal points using a GPRS technique such that subsequent distortion affecting accurate recovery of said signal points is reduced, the precoded signal points occupying a region substantially identical to said polygonal region; and means for recovering said data from a received signal representative of said precoded signal points, said recovering means including means for compensating for effects of said precoding means.

8. The system of claim 7 wherein said signal constellation has such a shape that said signal constellation and translated versions thereof can be interwoven throughout a plane without leaving any interspace for additional signal points.

9. The system of claim 7 wherein said data is encoded with a trellis code.

10. A method for transmitting data, said method comprising the steps of selecting signal points from a signal constellation derived from a rectangular lattice which includes a plurality of signal points within a polygonal region having more than four sides, each of said plurality of signal points representing data;

processing the selected signal points using a GPRS technique such that subsequent distortion affecting accurate recovery of said selected signal points is reduced, the processed signal points occupying a region substantially identical to said polygonal region; and transmitting a signal representing said processed signal points.

11. The method of claim 10 wherein said signal constellation has such a shape that said signal constellation and translated versions thereof can be interwoven throughout a plane without leaving any interspace for additional signal points.

12. The method of claim 10 wherein said data is encoded with a trellis code.

13. A method for recovering data represented by transmitted signal points, said transmitted signal points having been encoded by a precoding step to reduce subsequent distortion affecting accurate recovery of said data in accordance with a GPRS technique, said method comprising the steps of receiving said transmitted signal points, which occupy a region whose shape is substantially identical to that of a signal constellation, said signal constellation being derived from a rectangular lattice and including a plurality of signal points, said transmitted signal points being derived from selected ones of said plurality of signal points, said region being polygonal and having more than four sides; and recovering said data, said recovering step including the step of compensating for effects of said precoding step.

14. The method of claim 13 wherein said signal constellation has such a shape that said signal constellation and translated versions thereof can be interwoven throughout a plane without leaving any interspace for additional signal points.

15. The method of claim 13 wherein said data is encoded with a trellis code.

16. A method for communicating data, said method comprising the steps of selecting signal points from a signal constellation derived from a rectangular lattice which includes a plurality of signal points within a polygonal region having more than four sides, each of said plurality of signal points representing data;

precoding the selected signal points using a GPRS technique such that subsequent distortion affecting accurate recovery of said selected signal points is reduced, the precoded signal points occupying a region substantially identical to said polygonal region; and recovering said data from a received signal representative of said precoded signal points, said recovering step including the step of compensating for effects of said precoding step.

17. The method of claim 16 wherein said signal constellation has such a shape that said signal constellation and translated versions thereof can be interwoven throughout a plane without leaving any interspace for additional signal points.

18. The method of claim 16 wherein said data is encoded with a trellis code.

* * * * *